United States Patent
Muth et al.

(10) Patent No.: US 10,377,116 B2
(45) Date of Patent: Aug. 13, 2019

(54) METHOD FOR THE PRODUCTION OF A POLYCARBONATE LAMINATE

(71) Applicants: Bundesdruckerei GmbH, Berlin (DE); COVESTRO DEUTSCHLAND AG, Leverkusen (DE)

(72) Inventors: Oliver Muth, Berlin (DE); Arthur Mathea, Berlin (DE); Malte Pflughoefft, Berlin (DE); Jens Ehreke, Berlin (DE); Manfred Paeschke, Basdorf (DE); Heinz Pudleiner, Krefeld (DE); Cengiz Yesildag, Leverkusen (DE); Klaus Meyer, Dormagen (DE)

(73) Assignees: BUNDESDRUCKEREI GMBH, Berlin (DE); COVESTRO DEUTSCHLAND AG, Leverkusen (DE)

( * ) Notice: Subject to any disclaimer, the term of this patent is extended or adjusted under 35 U.S.C. 154(b) by 0 days.

(21) Appl. No.: 14/959,356

(22) Filed: Dec. 4, 2015

(65) Prior Publication Data
US 2016/0129679 A1    May 12, 2016

Related U.S. Application Data

(63) Continuation of application No. 12/740,523, filed as application No. PCT/DE2008/001751 on Oct. 29, 2008, now abandoned.

(30) Foreign Application Priority Data

Oct. 31, 2007    (DE) .......................... 10 2007 052 947

(51) Int. Cl.
*B42D 25/00*    (2014.01)
*B32B 37/06*    (2006.01)
(Continued)

(52) U.S. Cl.
CPC .......... *B32B 37/06* (2013.01); *B29C 45/0003* (2013.01); *B32B 27/08* (2013.01);
(Continued)

(58) Field of Classification Search
CPC ...... B42D 25/00; B42D 25/23; B42D 25/378; B42D 2033/30; B42D 25/351; B42D 25/48; B32B 2425/00; B41M 3/14
See application file for complete search history.

(56) References Cited

U.S. PATENT DOCUMENTS

| | | |
|---|---|---|
| 2,970,131 A | 1/1961 | Moyer |
| 2,991,273 A | 7/1961 | Hechelhammer |

(Continued)

FOREIGN PATENT DOCUMENTS

| | | |
|---|---|---|
| DE | 1570703 | 2/1970 |
| DE | 2063050 | 7/1972 |

(Continued)

OTHER PUBLICATIONS

"Chemistry and Physics of Polycarbonates", Hermann Schnell, Interscience Publishers, 1964, pp. 27-98.

(Continued)

*Primary Examiner* — Michael A Salvitti
(74) *Attorney, Agent, or Firm* — Stuart H. Mayer; Mayer & Williams PC

(57) ABSTRACT

The invention relates to the use of a preparation comprising A) 0.1 to 20 wt % of a binding agent with a polycarbonate derivative based on a geminally disubstituted dihydroxydiphenyl cycloalkane, B) 30 to 99.9 wt % of an organic solvent or of a mixture of solvents, C) 0 to 10 wt %, referred to dry mass, of a dye or of a mixture of dyes, D) 0 to 10 wt % of a functional material or of a mixture of functional materials, E) 0 to 30 wt % of additive and/or auxiliary substances, or of a mixture of such substances, the relative amounts of the (Continued)

components A) to E) always totaling 100 wt %, as an ink jet printing dye.

4 Claims, 2 Drawing Sheets

(51) Int. Cl.
  *C08G 64/06* (2006.01)
  *C09D 11/36* (2014.01)
  *B42D 25/378* (2014.01)
  *B42D 25/40* (2014.01)
  *B29C 45/00* (2006.01)
  *B32B 27/08* (2006.01)
  *B32B 27/20* (2006.01)
  *B32B 27/36* (2006.01)
  *C09D 11/102* (2014.01)
  *B29K 69/00* (2006.01)
  *B29L 9/00* (2006.01)

(52) U.S. Cl.
  CPC ............ *B32B 27/20* (2013.01); *B32B 27/365* (2013.01); *B42D 25/378* (2014.10); *B42D 25/40* (2014.10); *C08G 64/06* (2013.01); *C09D 11/102* (2013.01); *C09D 11/36* (2013.01); *B29K 2069/00* (2013.01); *B29L 2009/00* (2013.01); *B32B 2255/10* (2013.01); *B32B 2369/00* (2013.01); *B42D 2033/20* (2013.01); *Y10T 428/24479* (2015.01); *Y10T 428/24521* (2015.01)

(56) References Cited

U.S. PATENT DOCUMENTS

| | | | |
|---|---|---|---|
| 2,999,835 A | 9/1961 | Goldberg | |
| 2,999,846 A | 9/1961 | Schnell | |
| 3,028,365 A | 4/1962 | Schnell | |
| 3,062,781 A | 11/1962 | Bottenbruch | |
| 3,148,172 A | 9/1964 | Fox | |
| 3,271,367 A | 9/1966 | Schnell | |
| 3,275,601 A | 9/1966 | Schnell | |
| 4,456,667 A * | 6/1984 | Bochow | G03C 11/08 156/230 |
| 5,648,414 A * | 7/1997 | Bier | C09D 11/102 260/DIG. 38 |
| 6,060,426 A * | 5/2000 | Tan | B41M 5/41 427/150 |
| 6,066,594 A * | 5/2000 | Gunn | B32B 27/08 427/152 |
| 6,958,189 B2 * | 10/2005 | Weiss | C09D 11/101 428/412 |
| 8,404,333 B2 * | 3/2013 | Hagemann | B41M 3/14 156/272.8 |
| 8,478,080 B2 * | 7/2013 | Springmann | B41M 3/10 382/306 |
| 8,636,862 B2 * | 1/2014 | Muth | B32B 37/142 156/1 |
| 8,840,986 B2 * | 9/2014 | Kunzel | B29C 45/14688 427/256 |
| 10,150,324 B2 * | 12/2018 | Hagemann | B42D 25/305 |
| 2003/0211296 A1 * | 11/2003 | Jones | B32B 38/145 428/195.1 |
| 2004/0191521 A1 * | 9/2004 | Weiss | C09D 11/101 428/411.1 |
| 2004/0224103 A1 * | 11/2004 | Karst | B41M 7/0027 428/32.12 |
| 2004/0266910 A1 * | 12/2004 | Sugihara | C09D 11/03 523/160 |
| 2005/0242194 A1 * | 11/2005 | Jones | C09J 7/0207 235/487 |
| 2005/0247794 A1 * | 11/2005 | Jones | G06K 19/02 235/487 |
| 2008/0106002 A1 * | 5/2008 | Feldman | B32B 27/08 264/400 |
| 2008/0296887 A1 * | 12/2008 | Baggenstos | B42D 25/00 283/109 |
| 2010/0260985 A1 * | 10/2010 | Hagemann | B41M 3/14 428/211.1 |
| 2010/0291392 A1 * | 11/2010 | Leopold | B32B 7/045 428/412 |
| 2010/0301595 A1 * | 12/2010 | Muth | C09D 11/36 283/72 |
| 2010/0304093 A1 * | 12/2010 | Hagemann | B41M 3/14 428/172 |
| 2010/0310812 A1 * | 12/2010 | Muth | B32B 37/142 428/76 |
| 2011/0007934 A1 * | 1/2011 | Springmann | B41M 3/10 382/100 |
| 2011/0117350 A1 * | 5/2011 | Kunzel | B29C 45/14688 428/220 |
| 2013/0214524 A1 * | 8/2013 | Hagemann | B41M 5/0047 283/72 |
| 2015/0191037 A1 * | 7/2015 | Hagemann | B42D 25/305 427/8 |
| 2015/0220056 A1 * | 8/2015 | Weiser | G03H 1/0011 430/2 |
| 2016/0129679 A1 * | 5/2016 | Muth | C09D 11/36 156/277 |
| 2017/0129271 A1 * | 5/2017 | Hagemann | B42D 25/305 |

FOREIGN PATENT DOCUMENTS

| | | |
|---|---|---|
| DE | 2063052 | 7/1972 |
| DE | 2211956 | 10/1973 |
| DE | 3832396 | 2/1990 |
| DE | 297605 | 1/1992 |
| DE | 4421561 | 12/1995 |
| DE | 4422106 | 1/1996 |
| DE | 19832570 | 2/2000 |
| DE | 10159373 | 6/2003 |
| EP | 0688839 | 12/1995 |
| EP | 1493786 | 1/2005 |
| EP | 1690903 | 8/2006 |
| FR | 1561518 | 3/1969 |
| JP | 2004315765 | 11/2004 |

OTHER PUBLICATIONS

"Optical Document Security", Rudolf L. Van Renesse, Artech House, 2005, pp. 1-366.
"Dyes, General Survey", Booth et al., Ullmann's Encyclopedia of Industrial Chemistry, Wiley-VCH Verlag GmbH & Co., 2002, Article Online Posting Date: Jun. 15, 2000, pp. 1-61.
"Paints and Coatings", Stoye et al., Ullmann's Encyclopedia of Industrial Chemistry, Wiley-VCH Verlag GmbH & Co., 2006, Article Online Posting Date: Dec. 15, 2006, pp. 1-216.
"Imaging Technology", Winkelman et al., Ullmann's Encyclopedia of Industrial Chemistry, Wiley-VCH Verlag GmbH & Co., 2003, Article Online Posting Date: Mar. 15, 2003, pp. 1-116.
"Pigments, Organic", Hunger et al., Ullmann's Encyclopedia of Industrial Chemistry, Wiley-VCH Verlag GmbH & Co., 2002, Article Online Posting Date: Jun. 15, 2000, pp. 1-66.
"Pigments, Inorganic, 1. General", Hans G. Volz, Ullmann's Encyclopedia of Industrial Chemistry, Wiley-VCH Verlag GmbH & Co., 2009, Article Online Posting Date: Oct. 15, 2009, pp. 1-38.
"Pigments, Inorganic, 2. White Pigments", Auer et al., Ullmann's Encyclopedia of Industrial Chemistry, Wiley-VCH Verlag GmbH & Co., 2009, Article Online Posting Date: Oct. 15, 2009, pp. 1-40.
"Pigments, Inorganic, 3. Colored Pigments", Buxbaum et al., Ullmann's Encyclopedia of Industrial Chemistry, Wiley-VCH Verlag GmbH & Co., 2009, Article Online Posting Date: Oct. 15, 2009, pp. 1-49.
"Pigments, Inorganic, 4. Magnetic Pigments", Leitner et al., Ullmann's Encyclopedia of Industrial Chemistry, Wiley-VCH Verlag GmbH & Co., 2009, Article Online Posting Date: Oct. 15, 2009, pp. 1-8.
"Pigments, Inorganic, 5. Anticorrosive Pigments", Gunter Etzrodt, Ullmann's Encyclopedia of Industrial Chemistry, Wiley-VCH Verlag GmbH & Co., 2009, Article Online Posting Date: Oct. 15, 2009, pp. 1-22.

(56) References Cited

OTHER PUBLICATIONS

"Pigments, Inorganic, 6. Luster Pigments", Pfaff et al., Ullmann's Encyclopedia of Industrial Chemistry, Wiley-VCH Verlag GmbH & Co., 2009, Article Online Posting Date: Oct. 15, 2009, pp. 1-17.
"Pigments, Inorganic, 7. Transparent Pigments", Harald Gaedcke, Ullmann's Encyclopedia of Industrial Chemistry, Wiley-VCH Verlag GmbH & Co., 2009, Article Online Posting Date: Oct. 15, 2009, pp. 1-5.
Author unknown, "APEC for solubility applications" dated Aug. 14, 2001 by Bayer AG, 2 pages.

* cited by examiner

METHOD FOR THE PRODUCTION OF A POLYCARBONATE LAMINATE

FIELD OF THE INVENTION

The invention relates to the use of a preparation comprising: A) 0.1 to 20 wt % of an organic polymer, B) 30 to 99.9 wt % of a solvent, C) 0 to 10 wt %, referred to dry mass, of a dye or of a mixture of dyes, D) 0 to 10 wt % of a functional material or of a mixture of functional materials, E) 0 to 30 wt % of additive and/or auxiliary substances, or of a mixture of such substances, the relative amounts of the components A) to E) always totaling 100 wt %, as an ink jet printing dye.

The invention further relates to a method for making a structure with an ink jet printing layer arranged between two polycarbonate layers, to a structure obtainable by means of such a method, to the use of such a method for making a security and/or value document, and to a security and/or value document to be thus made.

BACKGROUND OF THE INVENTION AND PRIOR ART

A preparation to be used as an ink for ink jet printing is for instance known from the document EP 1690903 A. Therein, it is an aqueous ink for use on a sucking substrate, as for instance letter envelopes. If an organic polymer is provided, it does not serve as a binding agent, but as an additive for viscosity adjustment. Such inks cannot be used for printing on polycarbonate films for the following reasons explained with regard to paper-based security and/or value documents.

A personalization of PC (polycarbonate) based security and/or value documents takes place in the practice by means of the so-called laser engraving method, wherein by optical/thermal interactions of a material of the security and/or value document with the laser radiation, locally highly resolved pyrolysis processes are produced and thus local blackenings due to carbon generation occur. The disadvantage of this method is the limitation to black & white or at best gray scale representations.

A colored personalization established for paper-based documents in the ink jet printing method is not widely used for PC based security and/or value documents up to now. One reason for this is the lacking compatibility of the used polymers/binders (in connection with the other ink components such as dyes, additives, solvents) with polycarbonate. This applies for instance to the binders known from the documents *Ullmann's Encyclopedia of Industrial Chemistry*, Electronic Release 2007, Wiley Verlag, chapter "Imaging Technology, Ink-Jet Inks, and *Ullmann's Encyclopedia of Industrial Chemistry*, Electronic Release 2007, Wiley Verlag, chapter "Paints and Coatings", such as nitrocellulose, cellulose ester (cellulose acetate butyrate, CAB), polyacrylates, polyesters, epoxides etc. Secondly, PC films imprinted with such inks cannot easily be laminated. PC films imprinted over the full surface practically cannot be laminated at all, for the dye layer represents a barrier layer. In the event of an only partial printing process, there is the risk of a local delamination. Thirdly, polycarbonate is no sucking base. Common inks for ink jet printing are adjusted to good absorption times on paper and when imprinted on a non-sucking PC film they remain on the surface and can even after drying often completely be removed without residues, since the color does not penetrate into the material. Fourthly, ink jet printing layers made from insofar known inks lack temperature stability. Since in the field of security and/or value documents, imprinted PC films are typically laminated to each other under the action of pressure (>2 bars) and temperature (>160° C.), there is a risk of discoloration of the ink jet printing layer.

From the document EP 0 688 839 B1, silk-screen printing inks based on disubstituted dihydroxydiphenyl cycloalkanes are known. From this document can also be taken methods for making such polycarbonates. This document with its complete contents is hereby included in the scope of disclosure of the present application. Normally silk-screen printing inks can however not easily be used for ink jet printing, since ink jet printing poses special requirements for the used inks because of the nozzle technology of the printing heads.

Technical Object of the Invention

It is therefore the technical object of the invention to provide means, which permit the application of ink jet printing for making a security and/or value document based on polycarbonate polymer layers and provide ink jet printing layers on such layers, which satisfy all optical requirements, may in particular also be colored, wherein during a lamination the optical properties are not impaired, and which do not act as an barrier layer during the lamination, but rather even contribute to the formation of a monolithic structure from the polymer layers.

Basics of the Invention and Preferred Embodiments

For achieving this technical object, the invention teaches the use of a preparation comprising: A) 0.1 to 20 wt % of a binding agent with a polycarbonate derivative based on a geminally disubstituted dihydroxydiphenyl cycloalkane, B) 30 to 99.9 wt % of a preferably organic solvent or of a mixture of solvents, C) 0 to 10 wt %, referred to dry mass, of a dye or of a mixture of dyes, D) 0 to 10 wt % of a functional material or of a mixture of functional materials, E) 0 to 30 wt % of additive and/or auxiliary substances, or of a mixture of such substances, the relative amounts of the components A) to E) always totaling 100 wt %, as an ink jet printing dye.

First of all, the invention is based on the finding that polycarbonate derivatives used according to the invention are highly compatible with polycarbonate materials for films, in particular with polycarbonates based on bisphenol A, such as for instance Makrofol® films. The high compatibility is shown when the ink jet printing layer provided according to the invention with a polycarbonate derivative combines with the polycarbonate materials of the films to form a monolithic structure. A layer boundary between the materials cannot optically be detected anymore after the lamination. Further, the used polycarbonate derivative is stable at high temperatures and does not show any discolorations at temperatures up to 200° C. and more being typical for a lamination. Furthermore, it is surprising that an ink composition known for silk-screen printing (under adjustment of the viscosity) is also suitable, with regard to the used binder, for ink jet printing. Finally it was found to be an advantageous property that the dye of the composition penetrates into the imprinted polymer layer, so that a printing layer applied on the surface of the polymer layer cannot be removed in a non-destructive manner. Thus, compositions used according to the invention are also suitable e.g. for the surface personalization of security and/or value documents, since when printing on the polymer layer, an integral structure is formed.

As a result, the invention achieves that a security and/or value document based on polycarbonate films can be provided with a colored overprint, for instance during the personalization as a passport photograph, wherein the ink jet printing layer does not only not act as a barrier layer, but rather even more promotes the formation of a monolithic structure during the lamination. The structure fulfills with regard to integrity and durability all requirements.

In detail, the polycarbonate derivative may contain functional carbonate structure units of formula (I),

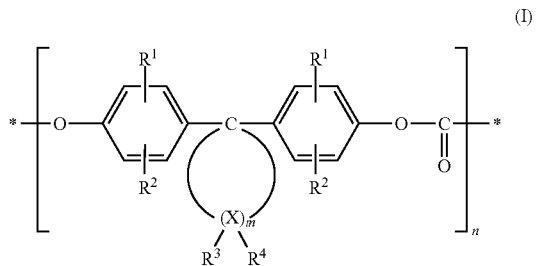

(I)

wherein $R^1$ and $R^2$ are independently from each other hydrogen, halogen, preferably chlorine or bromine, $C_1$-$C_8$ alkyl, $C_5$-$C_6$ cycloalkyl, $C_6$-$C_{10}$ aryl, preferred phenyl, and $C_7$-$C_{12}$ aralkyl, preferably phenyl-$C_1$-$C_4$ alkyl, in particular benzyl; m is an integer from 4 to 7, preferably 4 or 5; $R^3$ and $R^4$ can be individually selected for each X, and independently represent hydrogen or $C_1$-$C_6$ alkyl; X is carbon and n an integer greater than 20, with the proviso that at at least one atom X, $R^3$ and $R^4$ are both alkyl.

It is preferred, if at 1 to 2 atoms X, in particular at one atom X only, $R^3$ and $R^4$ both are alkyl. $R^3$ and $R^4$ may in particular be methyl. The X atoms in the alpha position to the diphenyl-substituted C atom ($C_1$) cannot be dialkyl-substituted. The X atoms in the beta position to $C_1$ can be disubstituted with alkyl. Preferred is m=4 or 5. The polycarbonate derivative may for instance be formed on the basis of monomers, such as 4,4'-(3,3,5-trimethyl cyclohexane-1,1-diyl)diphenol, 4,4'-(3,3-dimethyl cyclohexane-1,1-diyl)diphenol, or 4,4'-(2,4,4-trimethylcyclopentane-1,1-diyl)diphenol.

A polycarbonate derivative used according to the invention may for instance be made from diphenols of formula (Ia) according to the document DE 38 32 396.6, the scope of disclosure of which with its complete contents is hereby included in the scope of disclosure of this description.

A diphenol of formula (Ia) under formation of homopolycarbonates as well as several diphenols of formula (Ia) under formation of copolycarbonates can be used (the meaning of radicals, groups and parameters same as in formula I).

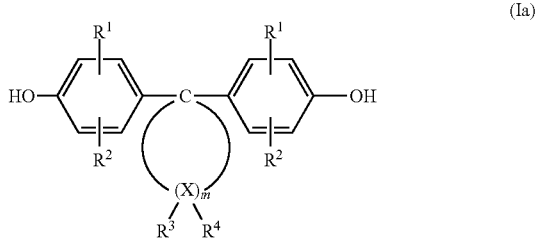

(Ia)

Furthermore, the diphenols of formula (Ia) can also be used in a mixture with other diphenols, for instance with those of formula (Ib)

$$HO-Z-OH \quad (Ib),$$

for making high-molecular, thermoplastic, aromatic polycarbonate derivatives.

Suitable other diphenols of formula (Ib) are those, wherein Z is an aromatic radical with 6 to 30 C atoms, which may contain one or several aromatic nuclei, be substituted and contain aliphatic radicals or other cycloaliphatic radicals than those of formula (Ia) or heteroatoms as bridge members.

Examples for the diphenols of formula (Ib) are: hydroquinone, resorcin, dihydroxydiphenyls, bi-(hydroxyphenyl)-alkanes, bis-(hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl)-sulfones, bis-(hydroxyphenyl)-sulfoxides, alpha,alpha'-bis-(hydroxyphenyl)-diisopropylbenzenes and their nuclear-alkylated and nuclear-halogenated compounds.

These and other suitable diphenols are e.g. described in the documents U.S. Pat. Nos. 3,028,365, 2,999,835, 3,148,172, 3,275,601, 2,991,273, 3,271,367, 3,062,781, 2,970,131 and 2,999,846, in the documents DE-A 1 570 703, 2 063 050, 2 063 052, 2 211 956, the FR-A 1 561 518 and in the monograph "H. Schnell, *Chemistry and Physics of Polycarbonates*, Interscience Publishers, New York 1964", which with its complete contents is hereby included in the scope of disclosure of the present application.

Preferred other diphenols are for instance: 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, alpha, alpha-bis-(4-hydroxyphenyl)-p-diisopropylenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfone, 2,4-bis-(3,5-dimethyl-4-hydroxyphenyl)-2-methylbutane, 1,1-bis-(3,5-dimethyl-4-hydroxyphenyl)-cyclohexane, alpha, alpha-bis-(3,5-dimethyl-4-hydroxyphenyl)-p-diisopropylbenzene, 2,2-bis-(3,5-dichloro-4-hydroxyphenyl)propane and 2,2-bis-(3,5-dibromo-4-hydroxyphenyl)-propane.

Particularly preferred diphenols of formula (Ib) are for instance: 2,2-bis-(4-hydroxyphenyl)-propane, 2,2-bis-(3,5-dimethyl-4-hydroxyphenyl)-propane, 2,2-bis-(3,5 dichloro-4-hydroxyphenyl)-propane, 2,2-bis-(3,5-dibromo-4-hydroxyphenyl)-propane and 1,1-bis-(4-hydroxyphenyl)-cyclohexane. In particular 2,2-bis-(4-hydroxyphenyl)-propane is preferred. The other diphenols may be used individually as well as in a mixture.

The molar ratio of diphenols of formula (Ia) to, if applicable, the also used other diphenols of formula (Ib) should be between 100 mol % (Ia) to 0 mol % (Ib) and 2 mol % (Ia) to 98 mol % (Ib), preferably between 100 mol % (Ia) to 0 mol % (Ib) and 10 mol % (Ia) to 90 mol % (Ib) and in particular between 100 mol % (Ia) to 0 mol % (Ib) and 30 mol % (Ia) to 70 mol % (Ib).

The high-molecular polycarbonate derivatives from the diphenols of formula (Ia), if applicable, in combination with other diphenols, may be made according to the known polycarbonate production methods. The different diphenols may be linked in a statistical manner as well as also block-wise.

The polycarbonate derivatives used according to the invention may be branched in a per se known manner. If the branching is desired, this can be achieved in a per se known manner by condensation of small amounts, preferably amounts between 0.05 and 2.0 mol % (referred to the used diphenols), at three or more than three-functional compounds, in particular such with three or more than three phenolic hydroxyl groups. Some branching agents with three or more than three phenolic hydroxyl groups are: phloroglucin, 4,6-dim ethyl-2,4,6-tri-(4-hydroxyphenyl)-heptene-2,4,6-dimethyl-2,4,6-tri-(4-hydroxyphenyl)heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenylisopropyl)-phenol, 2,6-is-(2-hydroxy-5-methyl-benzyl)-4-methylphenol, 2-(4-hydroxyphenyl)-2-(2,4-dihydroxyphenyl)-propane, hexa-[4-(4-hydroxyphenyl-isopropyl)-phenyl]-orthoterephthalic acid ester, tetra-(4-hydroxyphenyl)methane, tetra-[4-(4-hydroxyphenyl-isopropyl)phenoxy]-methane and 1,4-bis-[4',4"-dihydroxytriphenyl)-methyl]-benzene. Some of the other three-functional compounds are 2,4-dihydroxy benzoic acid, trimesic acid, cyanuric chloride and 3,3-bis-(3-methyl-4-hydroxyphenyl)-2-oxo-2,3-dihydroindol.

As chain stoppers for the per se known control of the molecular weight of the polycarbonate derivatives are used monofunctional compounds in usual concentrations. Suitable compounds are e.g. phenol, tert-butylphenols or other alkyl-substituted phenols. For controlling the molecular weight, in particular small amounts of phenols of formula (Ic) are suitable

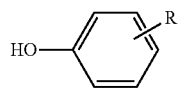

(Ic)

wherein R is a branched $C_8$ and/or $C_9$-alkyl radical.

Preferably the share of $CH_3$ protons in the alkyl radical R is between 47 and 89% and the share of the CH and $CH_2$ protons is between 53 and 11%; also preferably R is in an o and/or p position to the OH group, and particularly preferably the upper limit of the ortho share is 20%. The chain stoppers are used in general in amounts from 0.5 to 10, preferably 1.5 to 8 mol %, referred to the used diphenols.

The polycarbonate derivatives may preferably be made according to the phase boundary method (cf. H. Schnell *Chemistry and Physics of Polycarbonates*, Polymer Reviews, Vol. IX, page 33ff., Interscience Publ. 1964) in a per se known manner.

Herein, the diphenols of formula (Ia) are dissolved in an aqueous alkaline phase. For making copolycarbonates with other diphenols, mixtures of diphenols of formula (Ia) and the other diphenols, for instance those of formula (Ib), are used. For controlling the molecular weight, chain stoppers e.g. of formula (Ic) may be added. Then a reaction is performed in presence of an inert, preferably polycarbonate-dissolving, organic phase with phosgene according to the method of the phase boundary condensation. The reaction temperature is between 0° C. and 40° C.

If applicable, the used branching agents (preferably 0.05 to 2.0 mol %) may either be presented with the diphenols in the aqueous alkaline phase or be added dissolved in the organic solvent before the phosgenation. Beside the diphenols of formula (Ia) and, if applicable, other diphenols (Ib), thus their mono and/or bis-chlorocarbonic acid esters can also be used, the latter being added dissolved in organic solvents. The amount of chain stoppers and of branching agents then depends on the molar amount of diphenolate radicals corresponding to formula (Ia) and, if applicable, formula (Ib); when chlorocarbonic acid esters are also used, the amount of phosgene can correspondingly be reduced in a known manner.

Suitable organic solvents for the chain stoppers and, if applicable, for the branching agents and the chlorocarbonic acid esters are for instance methylene chloride, chlorobenzene and in particular mixtures of methylene chloride and chlorobenzene. If applicable, the used chain stoppers and branching agents can be dissolved in the same solvent.

As an organic phase for the phase boundary polycondensation serve for instance methylene chloride, chlorobenzene and mixtures of methylene chloride and chlorobenzene.

As an aqueous alkaline phase serves for instance a NaOH solution. Making the polycarbonate derivatives according to the phase boundary method can by catalyzed in a usual manner by catalyzers such as tertiary amines, in particular tertiary aliphatic amines such as tributylamine or triethylamine; the catalyzers can be used in amounts from 0.05 to 10 mol %, referred to the moles of used diphenols. The catalyzers can be added before the phosgenation or during or also after the phosgenation.

The polycarbonate derivatives can be made according to the known method in a homogeneous phase, the so-called "pyridine method" and according to the known method for the transesterification of molten mass by using for instance diphenyl carbonate instead of phosgene.

The polycarbonate derivatives may be linear or branched, they are homopolycarbonates or copolycarbonates based on the diphenols of formula (Ia).

By the arbitrary composition with other diphenols, in particular with those of formula (Ib), the polycarbonate properties can be varied in a favorable manner. In such copolycarbonates, the diphenols of formula (Ia) are contained in polycarbonate derivatives in amounts from 100 mol % to 2 mol %, preferably in amounts from 100 mol % to 10 mol % and in particular in amounts from 100 mol % to 30 mol %, referred to the total amount of 100 mol % of diphenol units.

A particularly advantageous embodiment of the invention is characterized by that the polycarbonate derivative comprises a copolymer in particular consisting of monomer units M1 based on formula (Ib), preferably bisphenol A, and monomer units M2 based on the geminally disubstituted dihydroxydiphenyl cycloalkane, preferably of the 4,4'-(3,3,5-trimethyl cyclohexane-1,1-diyl)diphenol, wherein the molar ratio M2/M1 is preferably greater than 0.3, in particular greater than 0.4, for instance greater than 0.5. For such copolymers it has namely been found that surprisingly the glass temperature Tg below 150° C. after a first heating cycle may be increased in a second heating cycle, which can substantially improve the stability of the obtained structure.

It is preferred, if the polycarbonate derivative has an average molecular weight (mean weight) of at least 10,000, preferably of 20,000 to 300,000.

The component B may in principle be substantially organic or aqueous. Substantially aqueous means that up to 20 wt % of the component B can be organic solvents. Substantially organic means that up to 5 wt % water may be present in the component B. Preferably the component B comprises or consists of a liquid aliphatic, cycloaliphatic, and/or aromatic hydrocarbon, a liquid organic ester, and/or of a mixture of such substances. The used organic solvents are preferably halogen-free organic solvents. These may in particular be aliphatic, cycloaliphatic, aromatic hydrocarbons, such as mesitylene, 1,2,4-trimethylbenzene, cumene and solvent naphtha, toluene, xylene; (organic) esters, such as methylacetate, ethylacetate, butylacetate, methoxypropylacetate, ethyl-3-ethoxypropionate. Preferred are mesitylene, 1,2,4-trimethylbenzene, cumene and solvent naphtha, toluene, xylene, acetic acid methyl ester, acetic acid ethyl ester, methoxypropylacetate, ethyl-3-ethoxypropionate. Particularly preferred are: mesitylene (1,3,5-trimethylbenzene), 1,2,4-trimethylbenzene, cumene (2-phenylpropane), solvent naphtha and ethyl-3-ethoxypropionate.

A suitable mixture of solvents comprises for instance L1) 0 to 10 wt %, preferably 1 to 5 wt %, in particular 2 to 3 wt %, of mesitylene, L2) 10 to 50 wt %, preferably 25 to 50 wt %, in particular 30 to 40 wt %, of 1-methoxy-2-propanolacetate, L3) 0 to 20 wt %, preferably 1 to 20 wt %, in particular 7 to 15 wt %, of 1,2,4-trimethylbenzene, L4) 10 to 50 wt %, preferably 25 to 50 wt %, in particular 30 to 40 wt %, of ethyl-3-ethoxypropionate, L5) 0 to 10 wt %, preferably 0.01 to 2 wt %, in particular 0.05 to 0.5 wt %, of cumene, and L6) 0 to 80 wt %, preferably 1 to 40 wt %, in particular 15 to 25 wt %, of solvent naphtha, the relative amounts of the components L1 to L6 always totaling 100 wt %.

Typically the first polycarbonate layer and the second polycarbonate layer have a glass temperature Tg of more than 145° C., in particular more than 147° C.

The polycarbonate derivative typically has an average molecular weight (mean weight) of at least 10,000, preferably from 20,000 to 300,000.

The preparation may comprise in detail: A) 0.1 to 10 wt %, in particular 0.5 to 5 wt %, of a binding agent with a polycarbonate derivative based on a geminally disubstituted dihydroxydiphenyl cycloalkane, B) 40 to 99.9 wt %, in particular 45 to 99.5 wt %, of an organic solvent or of a mixture of solvents, C) 0.1 to 6 wt %, in particular 0.5 to 4 wt %, of a dye or of a mixture of dyes, D) 0.001 to 6 wt %, in particular 0.1 to 4 wt %, of a functional material or of a mixture of functional materials, E) 0.1 to 30 wt %, in particular 1 to 20 wt %, of additive and/or auxiliary substances, or of a mixture of such substances.

If a dye should be provided, in principle any dye or mixture of dyes can be used as a component C. Dyes are all coloring substances. This means, they may be dyes (a survey of dyes is given in Ullmann's Encyclopedia of Industrial Chemistry, Electronic Release 2007, Wiley Verlag, chapter "Dyes, General Survey"), as well as pigments (a survey of organic and inorganic pigments is given in Ullmann's Encyclopedia of Industrial Chemistry, Electronic Release 2007, Wiley Verlag, chapter "Pigments, Organic" and "Pigments, Inorganic"). Dyes should be soluble or (stably) dispersible or suspensible in the solvents of the component B. Furthermore, it is advantageous, if the dye is stable, in particular color-stable at temperatures of 160° C. and more for a period of more than 5 min. It is also possible that the dye is subjected to a given and reproducible color change under the processing conditions and is selected correspondingly. Pigments must be present, in addition to the temperature stability, in particular in a finest particle size distribution. In the practice of ink jet printing this means that the particle size should not exceed 1.0 since otherwise occlusions in the printing head will result. Normally, nano-scale solid pigments have proven themselves.

The dyes may be kationic, anionic or also neutral. Examples for dyes used in ink jet printing are: Brillantschwarz C.I. Nr. 28440, Chromogenschwarz C.I. Nr. 14645, Direkttiefschwarz E C.I. Nr. 30235, Echtschwarzsalz B C.I. Nr. 37245, Echtschwarzsalz K C.I. Nr. 37190, Sudanschwarz HB C.I. 26150, Naphtolschwarz C.I. Nr. 20470, Bayscript® Schwarz Flüssig, C.I. Basic Black 11, C.I. Basic Blue 154, Cartasol® Türkis K-ZL Flüssig, Cartasol® Türkis K-RL Flüssig (C.I. Basic Blue 140), Cartasol Blau K5R Flüssig. Suitable are further e.g. the commercially obtainable dyes Hostafine® Schwarz TS Flüssig (sold by Clariant GmbH Germany), Bayscript® Schwarz Flüssig (C.I. mixture, sold by Bayer AG Germany), Cartasol® Schwarz MG Flüssig (C.I. Basic Black 11, registered trademark of Clariant GmbH Germany), Flexonylschwarz® PR 100 (E C.I. Nr. 30235, sold by Hoechst AG), Rhodamin B, Cartasol® Orange K3 GL, Cartasol® Gelb K4 GL, Cartasol® K GL, or Cartasol® Rot K-3B. Further, as soluble dyes can be used anthraquinone, azo, quinophthalone, cumarin, methin, perinone, and/or pyrazole dyes, e.g. obtainable under the trade name Macrolex®. Further suitable dyes are described in the document Ullmann's Encyclopedia of Industrial Chemistry, Electronic Release 2007, Wiley Verlag, chapter "Colorants Used in Ink Jet Inks". Well soluble dyes will lead to an optimum integration in the matrix or the binder of the printing layer. The dyes can be added either directly as a dye or pigment or as a paste, a mixture of dye and pigment together with an additional binder. This additional binder may be different from a binder according to the invention (e.g. may be a polyester), should however be chemically compatible with the additional components of the preparation used according to the invention. If such a paste is used as a dye, the amount of the component B refers to the dye without the other components of the paste. These other components of the paste must then be subsumed under the component E. When using so-called colored pigments in the scale colors cyan-magenta-yellow and preferably also (soot-) black, full-tone color images are possible.

The component D comprises substances, which by using technical means can immediately be seen by the human eye or by using suitable detectors. These are materials familiar to the man skilled in the art (cf. also van Renesse, Optical Document Security, 3rd ed., Artech House, 2005), which are used for the protection of value and security documents. Thereto belong luminescent substances (dyes or pigments, organic or inorganic) such as e.g. photoluminophores, electroluminophores, anti-Stokes luminophores, fluorophores, but also magnetizable, photo-acoustically addressable or piezoelectric materials. Furthermore, Raman-active or Raman-amplifying materials can be used, same as so-called barcode materials. Here, too, the preferred criteria are either the solubility in the component B or for pigmented systems particle sizes <1 μm and temperature stability for temperatures >160° C. in the meaning of the explanations with regard to the component C. Functional materials can directly be added or via a paste, i.e. mixture with an additional binder, which is then a constituent of the component E, or the binder of the component A used according to the invention.

The component E comprises the substances normally used for inks in ink jet printing, such as anti-foam agents, set-up agents, wetting agents, tensides, floating agents, drying agents, catalyzers, (light) stabilizers, preservation agents, biocides, tensides, organic polymers for viscosity adjustment, buffer systems, etc. Set-up agents are for instance conventional set-up salts. An example is sodium lactate. As biocides may be used all commercially available preservation agents, which are used for inks. Examples are Proxel®GXL and Parmetol® A26. Tensides may be all commercially available tensides, which are used for inks. Preferred are amphoteric or non-ionic tensides. Of course, however, the use of special anionic or cationic tensides, which do not alter the properties of the dye, is also possible. Examples for suitable tensides are betaines, ethoxilated diols etc. Examples are the product series Surfynol® and Tergitol®. The amount of tensides is for instance selected such that the surface tension of the ink is in the range from 10 to 60 mN/m, preferably from 25 to 45 mN/m, measured at 25° C. A buffer system may be provided, which stabilizes the pH value in the range from 2.5 to 8.5, in particular in the range from 5 to 8. Suitable buffer systems are lithium acetate, borate buffer, triethanolamine or acetic acid/sodium acetate. A buffer system will in particular be applied in the case of a substantially aqueous component B. For adjusting the viscosity of the ink, (if applicable) water-soluble polymers may be provided. These may be all polymers being suitable for conventional ink formulations. Examples are water-soluble starch, in particular with an average molecular weight from 3,000 to 7,000, polyvinylpyrolidone, in particular with an average molecular weight from 25,000 to 250,000, polyvinyl alcohol, in particular with an average molecular weight from 10,000 to 20,000, xanthan gum, carboxymethyl cellulose, ethylene oxide/propylene oxide block copolymer, in particular with an average molecular weight from 1,000 to 8,000. An example for the above block copolymer is the product series Pluronic®. The share of biocide, referred to the total amount of ink, may be in the range from 0 to 0.5 wt %, preferably from 0.1 to 0.3 wt %. The share of tenside, referred to the total amount of ink, may be in the range from 0 to 0.2 wt %. The share of set-up agents, referred to the total amount of ink, may be from 0 to 1 wt %, preferably from 0.1 to 0.5 wt %.

To the auxiliary agents also belong all other components, such as for instance acetic acid, formic acid or n-methyl pyrolidone or other polymers from the used dye solution or paste.

With regard to substances, which are suitable as component E, reference is made for instance to Ullmann's Encyclopedia of Chemical Industry, Electronic Release 2007, Wiley Verlag, chapter "Paints and Coatings", section "Paint Additives".

The invention further relates to a method for making a structure with at least one first polymer layer and, optionally, a second polymer layer, each made from a polycarbonate polymer based on bisphenol A, wherein on the first polymer layer an ink jet printing layer is arranged, comprising the following steps: a) on at least one partial region of the first polymer layer, the ink jet printing layer from a preparation used according to the invention is applied, b) optionally, the ink jet printing layer is dried, c) optionally after step a) or step b), the second polymer layer is placed on the first polymer layer, covering the ink jet printing layer, and the first polymer layer and the second polymer layer are laminated with each other under pressure, at a temperature from 120° C. to 230° C. and for a defined time.

In other words, a structure according to the invention may only consist of a polymer layer and of a printing layer applied by means of the preparation used according to the invention, may however also comprise another polymer layer, if applicable, in another structure with additional layers. It is for instance possible that the printing layer is provided as the uppermost layer within a structure (if applicable, with additional layers). Further, the printing layer can be imprinted directly and without another cover on a polymer layer adapted as an overlay film.

The ink jet printing layer may be provided over the full surface on the first polymer layer. In most cases, however, the ink jet printing layer will be provided in a partial region only of the surface of the first polymer layer.

The specific pressure (pressure directly at the workpiece) in step d) is typically in the range from 1 bar to 10 bars, in particular in the range from 3 bars to 7 bars. The temperature in step d) is preferably in the range from 140° C. to 200° C., in particular in the range from 150° C. to 180° C. The time of the step d) may be in the range from 0.5 s to 120 s, in particular from 5 s to 60 s.

In step b), drying can be performed at a temperature in the range from 20° C. to 120° C., in particular from 20° C. to 80° C., preferably from 20° C. to 60° C., for a time of at least 1 s, preferably from 5 s to 6,000 s.

The first polycarbonate layer and the second polycarbonate layer may, independently from each other, have a glass temperature Tg of more than 145° C.

The thickness of the first polycarbonate layer and of the second polycarbonate layer may be, identical or different, in the range from 10 to 1,000 in particular from 20 to 200 µm.

The thickness, measured in directions orthogonal to a main face of a polycarbonate layer, of the ink jet printing layer may be, before or after drying, in the range from 0.01 to 10 in particular from 0.05 to 5 preferably from 0.02 to 1 µm.

Subject matter of the invention is also a structure obtainable with a method according to the invention. Such a structure typically contains at least one first polycarbonate layer and a second polycarbonate layer and an ink jet printing layer from a preparation used according to the invention and arranged between the first polycarbonate layer and the second polycarbonate layer.

A method according to the invention for making a structure may be used for making a security and/or value document, wherein optionally simultaneously with, before or after the production of the structure, the first polycarbonate layer and/or the second polycarbonate layer are directly or indirectly connected in a stack with at least one additional layer, for instance a carrier layer.

Examples for security and/or value documents are: identity cards, passports, ID cards, access control cards, visas, tax symbols, tickets, driver's licenses, vehicle documents, banknotes, checks, postage stamps, credit cards, any chip cards and adhesive labels (e.g. for product protection). Such security and/or value documents typically comprise at least one substrate, a printing layer and optionally a transparent cover layer. Substrate and cover layer themselves may be composed of a multitude of layers. A substrate is a carrier structure, onto which the printing layer with information, images, patterns and the like is applied. As materials for a substrate, all conventional materials on a paper and/or (organic) polymer basis can be used. Such a security and/or value document comprises within the total multi-layer structure a structure according to the invention. Beside the structure according to the invention, at least one (additional) printing layer may be provided, which may be applied on an external surface of the structure or on an additional layer connected with the structure.

Finally, the invention relates to a security and/or value document to be thus made or comprising a structure according to the invention.

The invention can however also be used in other technical fields. Abrasion-resistant decorations of injection-molded parts can be made by in-mold lamination of films. According to prior art, PC films are imprinted by silk-screen printing, plastically deformed (e.g. deepdrawing), placed in an injection mold and in-mold laminated with a thermoplastic material. In this way, e.g. casings for mobile phones or decorative housings are made. Multi-colored decorations require the production of several printing forms/printing screens and are therefore only economical for high quantities. With an ink used according to the invention, however, also piece productions or unique motives are possible, and thus e.g. individualized, highly abrasion-resistant casings for mobile phones (for example with a photograph) or personalized tachometer discs (e.g. initials of the owner) can be produced.

Therefore, the invention also relates to a method for making a structure with at least one polymer layer and an injection-molded part from a polymer material, wherein between the polymer layer and the injection-molded part an ink jet printing layer is arranged, comprising the following steps: a) on at least one partial region of the polymer layer, the ink jet printing layer from a preparation used according to the invention is applied, b) optionally, the ink jet printing layer is dried, c) after step a) or step b), the polymer layer is placed in an injection mold (if necessary after plastic deformation of the imprinted polymer layer for fitting to the walls of the injection mold), the ink jet printing layer showing toward inside, d) into the injection mold, the polymer material is injected at a temperature of at least 60° C., and e) after cooling-off to a temperature of at least 20° C. below the temperature of the step d), the structure is taken from the injection mold.

The polymer layer may preferably be a polycarbonate layer based on bisphenol A. As polymer materials, in principle all thermoplastic polymers usual in the field of plastic injection can be used.

The temperature in step d) may be in the range from 80° C. to 200° C., in particular in the range from 100° C. to 180° C. The temperature in step e) may be at least 40° C. below the temperature in step d).

In principle, otherwise all explanations given in the context with a structure for a security and/or value document will apply in an analogous manner.

Therefore, the invention also comprises a structure comprising at least one polycarbonate layer and an injection-molded part and an ink jet printing layer from a preparation used according to the invention and arranged between the polycarbonate layer and the injection-molded part.

BRIEF DESCRIPTION OF THE DRAWINGS

In the following, the invention is described in more detail with reference to nonlimiting embodiments. There are.

DETAILED DESCRIPTION OF THE INVENTION

Figure 1:
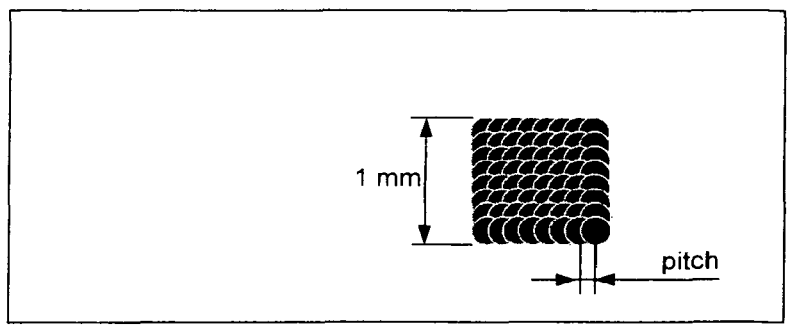
FIG. 1: a representation of a test print area.

Example 1: Making Polycarbonate Derivatives to be Used According to the Invention Example 1.1: Making a First Polycarbonate Derivative 205.7 g (0.90 mole) bisphenol A (2,2-bis-(4-hydroxyphenyl)-propane, 30.7 g (0.10 mole) 1,1-bis-(4-hydroxyphenyl)-3,3,5-trimethyl cyclohexane, 336.6 g (6 mole) KOH and 2,700 g water are dissolved in an inert gas atmosphere under stirring. Then a solution of 1.88 g phenol in 2,500 ml methylene chloride is added. Into the well stirred solution, 198 g (2 mole) phosgene are introduced at pH 13 to 14 and 21 to 25° C. Then 1 ml ethylpiperidine is added and stirred for another 45 min. The bisphenolate-free aqueous phase is separated, after acidification with phosphoric acid, the organic phase is washed neutrally with water and freed from solvent.

The polycarbonate derivative had a relative solution viscosity of 1.255. The glass temperature was determined to be 157° C. (DSC).

Example 1.2: Making a Second Polycarbonate Derivative

In an analogous manner to Example 1, a mixture of 181.4 g (0.79 mole) bisphenol A and 63.7 g (0.21 mole) 1,1-bis-(4-hydroxyphenyl)-3,3,5-trimethyl cyclohexane was reacted to the polycarbonate derivative.

The polycarbonate derivative has a relative solution viscosity of 1.263. The glass temperature was determined to be 167° C. (DSC).

Example 1.3: Making a Third Polycarbonate Derivative

In an analogous manner to Example 1, a mixture of 149.0 g (0.65 mole) bisphenol A (2,2-bis-(4-hydroxyphenyl)-propane and 107.9 g (0.35 mole) 1,1-bis-(4-hydroxyphenyl)-3,3,5-trimethyl cyclohexane was reacted to the polycarbonate derivative.

The polycarbonate derivative had a relative solution viscosity of 1.263. The glass temperature was determined to be 183° C. (DSC).

Example 1.4: Making a Fourth Polycarbonate Derivative

In an analogous manner to Example 1, a mixture of 91.6 g (0.40 mole) bisphenol A and 185.9 g (0.60 mole) 1,1-bis-(4-hydroxyphenyl)-3,3,5-trimethyl cyclohexane was reacted to the polycarbonate derivative.

The polycarbonate derivative had a relative solution viscosity of 1.251. The glass temperature was determined to be 204° C. (DSC).

Example 1.5: Making a Fifth Polycarbonate Derivative

As in Example 1, a mixture of 44.2 g (0.19 mole) bisphenol A and 250.4 g (0.81 mole) 1,1-bis-(4-hydroxyphenyl)-3,3,5-trimethyl cyclohexane was reacted to the polycarbonate.

The polycarbonate derivative had a relative solution viscosity of 1.248. The glass temperature was determined to be 216° C. (DSC).

Example 2: Making a Liquid Preparation being Suitable for Making an Ink Jet Printing Dye A liquid preparation was made from 17.5 weight parts of the polycarbonate derivative from Example 1.3 and 82.5 weight parts of a solvent mixture according to Table I.

TABLE I

| | |
|---|---|
| Mesitylene | 2.4 |
| 1-methoxy-2-propanolacetate | 34.95 |

TABLE I-continued

| | |
|---|---|
| 1,2,4-trimethylbenzene | 10.75 |
| Ethyl-3-ethoxypropionate | 33.35 |
| Cumol | 0.105 |
| Solvent naphtha | 18.45 |

A colorless, highly viscous solution with a solution viscosity of 800 mPa·s at ambient temperature was obtained.

Example 3: Making a First Ink Jet Printing Dye Used According to the Invention In a 50 mL wide-neck thread glass, 4 g polycarbonate solution of Example 2 and 30 g of the mixture of solvents of Example 2 were homogenized with a magnetic stirrer. A colorless, low-viscous solution with a solution viscosity of 1.67 mPa·s at ambient temperature was obtained.

The surface tension of this basic ink was determined with an OEG Surftens measuring system according to the pendant drop method to be 21.4±1.9 mN/m.

An addition of a pigment or of a dye was not made, since this ink only served for use in the test print of Example 6.

Example 4: Making a Second Ink Jet Printing Dye Used According to the Invention In an analogous manner to Example 3, 10 g polycarbonate solution of Example 2 and 32.5 g mixture of solvents of Example 2 were homogenized with a magnetic stirrer (4% PC solution). A colorless, low-viscous solution with a solution viscosity of 5.02 mPa·s at 20° C. was obtained. Here, too, no addition of a pigment or dye was made, since this ink only served for use in the test print of Example 7.

Example 5: Making a Third Ink Jet Printing Dye Used According to the Invention A polycarbonate solution according to Example 4 was prepared and additionally reacted with approx. 2% pigment Black 28. An ink results, by means of which black & white images can be printed on polycarbonate films, and reference is made to Example 8.

Example 6: Drop Size when Printing with an Ink According to Example 3

The solution of Example 3 was transferred by filtration into a printer cartridge and printed with an ink jet printer FUJIFILM-Dimatix DMP 2800 under variation of various printing parameters. The used printer is a so-called drop-on-demand system, wherein the drop generation is made by a piezoelectric printing head. The DMP 2800 has a stroboscopic image recording system, by means of which the drop formation and the drop path can be investigated. The prints were dried at 100° C. for 30 min. Depending on the base, different drop sizes can be achieved, as is shown in Table 1.

TABLE 1

| Substrate | Glass | Polycarbonate (smooth) | Velin paper |
|---|---|---|---|
| Ø individual drops | ~74 µm | ~85 µm | ~100 µm |

As expected, on sucking bases, the drops will be absorbed more than on non-sucking bases such as glass or plastic.

Example 7: Determination of the Layer Thickness of an Ink Jet Printing Layer An ink according to Example 4 was printed on glass substrates. The so-called drop distance (pitch, see also FIG. 1) varied from 10 to 45 The prints were again dried at 100° C. for 30 min. Then layer thickness measurements were made (Arithmetic Step Height=ASH) with a profilometer (Dektak 6M; 12.5 µm Stylus), and the results are listed in Table 2.

TABLE 2

| Pitch | ASH [nm] |
|---|---|
| 10 µm | 685 |
| 30 µm | 100 |
| 45 µm | 27 |

By the drop distance alone, the layer thickness can be adjusted in a wide range.

Figure 2:
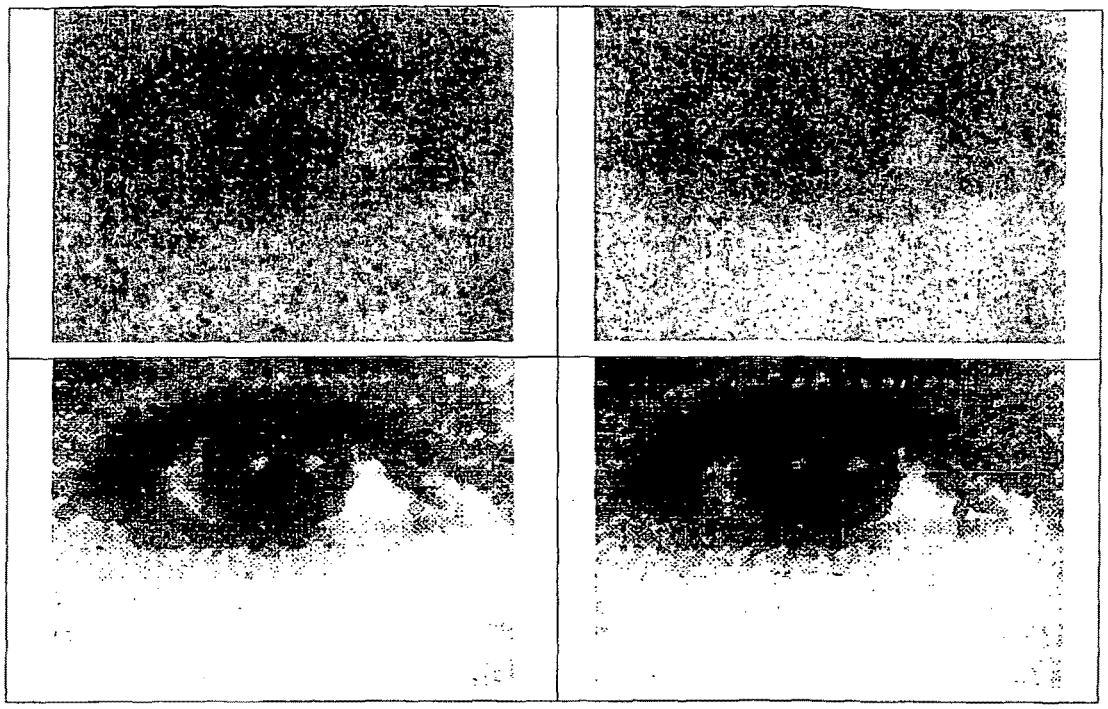
FIG. 2: details of a portrait of a person made by a method according to the invention.

Example 8: Making an Image and Verifying the Optical Quality after the Lamination Using the ink of Example 5, a portrait of a person was printed on Makrofol® 4-4. The thus produced portrait was laminated together with transparent Makrofol® 6-2-films at temperatures >180° C., pressures >5 bar and times >10 min to form a structure of approx. 800 µm thickness. Light-microscopic investigations before and after the lamination were made, in order to evaluate the edge definition of individual pixels. The results are shown in FIG. 2. There are shown on top in FIG. 2 colored printing images (top) and thereunder the same printing images, however after conversion into black & white. On the left side, there is shown a detailed representation of the ink jet printing layer made according to the invention before the lamination. On the right side, the same detailed representation is shown after the lamination. It can be seen that the pixel patterns are maintained also after the lamination in nearly the same resolution. The horizontal lines result from the overlapping sections of the individual ink jet nozzles of the printing head and have therefore nothing to do with the ink according to the invention.

Apart from that, an optical investigation of the structure did not show any recognizable phase limit. The structure is a monolithic block excellently resisting to delamination.

The invention claimed is:

1. A method for making a structure with at least a first polymer layer and a second polymer layer, each made from a polycarbonate polymer containing repeating units derived from bisphenol A, wherein on the first polymer layer an ink jet printing layer is arranged, comprising the following steps:
   a) ink jet printing a preparation, the preparation comprising (1) a binding agent comprising 0.1 to 20 wt % of the polycarbonate polymer with a polycarbonate derivative based on a geminally disubstituted dihydroxydiphenyl cycloalkane, wherein the polycarbonate derivative is based on 4,4'-(3,3,5-trimethylcyclohexane-1,1-diyl)diphenol and has a softening temperature of 185° C. or less, and wherein the polycarbonate polymer in the ink jet printing preparation is different from the polycarbonate polymer in the first and second polymer layer;

(2) 30 to 99.9 wt % of a solvent or of a mixture of solvents, (3) 0 to 10 wt %, referred to dry mass, of a dye or of a mixture of dyes, (4) 0 to 10 wt % of a functional material or of a mixture of functional materials, and (5) 0 to 30 wt % of additive and/or auxiliary substances, or of a mixture of such substances, wherein the relative amounts of the components (1) to (5) always totals 100 wt %, as an ink jet printing dye directly on at least one partial region of the first polymer layer, b) optionally, drying the ink jet printing layer, c) after step a) or step b), placing the second polymer layer on the first polymer layer, covering the ink jet printing layer, and laminating the first polymer layer and the second polymer layer with each other under pressure, at a temperature of 150° C. to 180° C. 9 for a defined time.

2. The method according claim 1, wherein each of the first polycarbonate layer and the second polycarbonate layer have a glass temperature Tg of more than 145° C.

3. The method according to claim 1, wherein the thickness of each of the first polycarbonate layer and of the second polycarbonate layer is up to 1,000 μm.

4. The method according to claim 1, wherein the thickness, measured in directions orthogonal to a main face of a polycarbonate layer, of the ink jet printing layer is in the range from 0.01 to 10 μm.

* * * * *